United States Patent [19]
Fitzgerald et al.

[11] 3,712,117
[45] Jan. 23, 1973

[54] HIGH PRECISION WIDE DYNAMIC RANGE VISCOUS LOSS MEASURING APPARATUS

[75] Inventors: J. Vincent Fitzgerald, Metuchen; Frank J. Matusik; Hans R. Oppliger, both of Piscataway, all of N.J.

[73] Assignee: National Metal and Refining Company, Inc., Edison, N.J.

[22] Filed: Jan. 12, 1971

[21] Appl. No.: 105,833

[52] U.S. Cl. .................................. 73/59, 137/92
[51] Int. Cl. .................................. G01n 11/16
[58] Field of Search .......................... 73/59, 54

[56] References Cited

UNITED STATES PATENTS

| | | | |
|---|---|---|---|
| 2,696,735 | 12/1954 | Woodward | 73/59 |
| 2,550,052 | 4/1951 | Fay | 73/59 |
| 2,707,391 | 5/1955 | McSkimin | 73/59 |
| 3,382,706 | 5/1968 | Fitzgerald et al. | 73/54 X |

Primary Examiner—Louis R. Prince
Assistant Examiner—Joseph W. Roskos
Attorney—Arthur L. Lessler

[57] ABSTRACT

A viscosity measuring system especially useful in pollution and chemical process control applications. A variable gain amplifier drives a magnetic coil which causes a torsion member to oscillate. The amplitude of the oscillations is sensed by a transducer, and converted to a DC voltage by an amplitude monitoring circuit. The DC voltage, which represents the instantaneous amplitude of mechanical oscillation, is compared to a reference DC voltage which represents the desired amplitude of oscillation. The resulting error signal is utilized to control the gain of the amplifier in such a manner that the amplitude of mechanical oscillation is maintained constant and equal to the desired amplitude. The viscosity of the fluid in which the torsion member is immersed is obtained by providing an output signal which is a measure of the power provided by the amplifier to the magnetic coil in order to maintain the desired constant amplitude of oscillation. Preferably, the output signal is obtained from the voltage developed across a resistor in series with the magnetic coil.

13 Claims, 8 Drawing Figures

INVENTORS
J. VINCENT FITZGERALD
FRANK J. MATUSIK &
HANS R. OPPLIGER

BY Arthur L. Tassler
ATTORNEY

INVENTORS
J. VINCENT FITZGERALD
FRANK J. MATUSIK &
HANS R. OPPLIGER

BY Arthur L. Lesle
ATTORNEY

Fig. 8.

HIGH PRECISION WIDE DYNAMIC RANGE VISCOUS LOSS MEASURING APPARATUS

This invention relates to apparatus for determining the viscous loss in a material. The material may be (i) a solid, in which case the apparatus provides a measure of the internal friction within the solid material, or (ii) a fluid, in which case the apparatus provides a measure of the viscosity of the fluid.

An important area of utilization of viscosity measurement systems is that of pollution control. Pollution of streams and lakes by discharge of industrial wastes and sewage can be reduced by, in addition to other techniques, dilution of such discharges to a sufficiently low viscosity so that they are dissipated in the streams or lakes into which they feed. In order to accomplish such dilution on an automatic basis, a viscosity measurement system which enables remote monitoring of viscosity changes on a continuous basis, is needed.

In order to reduce pollution caused by automotive exhausts, it is necessary for manufacturers of automobile carburetors to adjust the fuel systems thereof to extremely close tolerances in order to insure that combustion occurs with minimum pollution of the air by noxious exhaust products. In order to adjust carburetor fuel systems to such precise tolerances, so that the fuel is delivered uniformly and at exactly the required rate, it is essential that the carburetor be adjusted at the factory under conditions where it is supplied with fuel blended to a precisely controlled viscosity. The viscosity of the fuel supplied during the carburetor adjustment process is quite critical, since the small metering jets through which the fuel passes are such that small variations in viscosity result in significant changes in the fuel delivery rate.

Many techniques are presently known in the art for providing measurement of fluid viscosity. These techniques are generally described in Chapter VII of "Frictional Phenomena," by Andrew Gemant, Chemical Publishing Company, Inc., Brooklyn, N.Y., U.S.A., 1950.

Among the more accurate and commercially practicable measuring techniques are those which utilize the damping effect of a fluid on a vibrating solid member which is immersed therein. Some of these techniques operate on an intermittent basis, by exciting the solid member into vibration in a desired (usually longitudinal or torsional) mode and observing the oscillation decrement due to the damping effect of the fluid.

One particular viscosity measuring technique of the vibrating member type utilizes a feedback amplifier to maintain the vibrating member in mechanical oscillation by supplying energy thereto to overcome viscous (and other inherent mechanical and electrical) losses. Such feedback type, vibrating solid member viscosity measuring techniques are exemplified by (i) that of Philippoff (longitudinal mode), described in "Frictional Phenomena" (idem) at pages 176–181, and (ii) in that described in U.S. Pat. No. 2,550,052 to C. H. Fay (torsional mode).

The Philippoff arrangement does not provide for any regulation of the amplitude of mechanical oscillation, but simply provides as output information the anode current of the feedback amplifier tube and the amplitude and frequency of mechanical oscillation. Considerable computation is then required to determine the viscosity of the fluid in which the vibrating member is immersed. In addition, since the gain of the amplifying tube and the amplitude of mechanical oscillation are not controlled, the accuracy and linearity of measurement, as well as the range of viscosities which can be accommodated, are quite limited.

The arrangement described in the Fay patent overcomes some, but not all, of the disadvantages of the Philippoff system. In the Fay apparatus, which employs a solid member vibrating in a torsional mode, the amplitude of mechanical oscillation is maintained within a relatively small range by means of a temperature sensitive resistor (the lamp 81 shown in FIG. 3 of the Fay patent). A variable gain amplifier is employed to provide the feedback necessary to sustain mechanical oscillation. The gain of the amplifier is coarsely controlled by means of an attenuator which is manually adjusted until the system oscillates within the linear range of the amplifier, the amplitude of oscillation then being approximately maintained by the aforementioned temperature sensitive resistor, which varies the amount of negative feedback internal to the amplifier in accordance with the amplifier output voltage. A measure of the viscosity of the liquid in which the vibrating member is immersed is provided by determining the gain of the amplifier when it is operating in its linear region. This gain is in turn determined by adding the setting of the attenuator to a number determined by the resistance of the temperature sensitive resistor, said resistance being in turn measured by means of a bridge arrangement which is manually adjusted to its balanced condition.

Thus the arrangement described by Fay, while providing improved accuracy over that of Philippoff, requires considerable manual adjustment to obtain the desired viscosity reading and, due to the variability, relative insensitivity, relatively long thermal time constant, and ambient temperature dependence of the temperature sensitive resistor which acts as the gain control element, is still of somewhat limited accuracy. Due to the manual operation required, the Fay arrangement is not capable of automatically monitoring viscosity, and is especially limited in applications where the viscosity to be measured may vary over a relatively wide range.

Furthermore, when the Fay apparatus is adjusted, as by a shift from one viscosity range to another, in order to measure change in viscosity, a relatively long time (of the order of seconds) is required for the temperature sensitive resistance lamp to compensate for the viscosity change. Thus two systems with long time constants, i.e. (i) the solid member vibrating in a torsional mode and (ii) the temperature sensitive resistance lamp, make Fay's apparatus sluggish. While a single long time constant element in a system can be compensated by negative feedback, two such elements make the system either very sluggish or unstable.

Thus, neither the Philippoff nor the Fay feedback type vibrating member viscosity measurement systems are suitable for remote monitoring or process control applications, since they are of limited accuracy and are incapable of providing continuous indications, without manual adjustment, as the viscosity of the fluid to be monitored varies.

An object of the present invention is to provide a viscosity measuring apparatus of the vibrating member feedback type which is more accurate than previously known arrangements of such type, which reacts more rapidly to viscosity changes, which is suitable for remote monitoring and process control applications, and which provides continuous indication of viscosity over a wide dynamic range of viscosity variation.

As herein described, there is provided apparatus for determining the viscous loss in a material. The apparatus comprises a vibratory member which receives power from a driving means to maintain the member in mechanical oscillation. A transducer is provided for detecting the oscillation, and an amplitude monitoring circuit is coupled to the transducer. The amplitude monitoring circuit provides a signal having a value manifesting the amplitude of mechanical oscillation. The apparatus includes means for providing an amplitude reference signal having a value corresponding to a desired amplitude of mechanical oscillation. A comparator provides an amplitude correction signal having a value determined by the difference between the signal provided by the amplitude monitoring circuit and the amplitude reference signal. The amplitude correction signal is applied to the driving means so that the driving means supplies sufficient power to the vibratory member to overcome the viscous loss and maintain the member in mechanical oscillation at the desired amplitude. An output signal is provided having a value which is a measure of the power supplied to the vibratory member by the driving means.

Figures 1, 2:
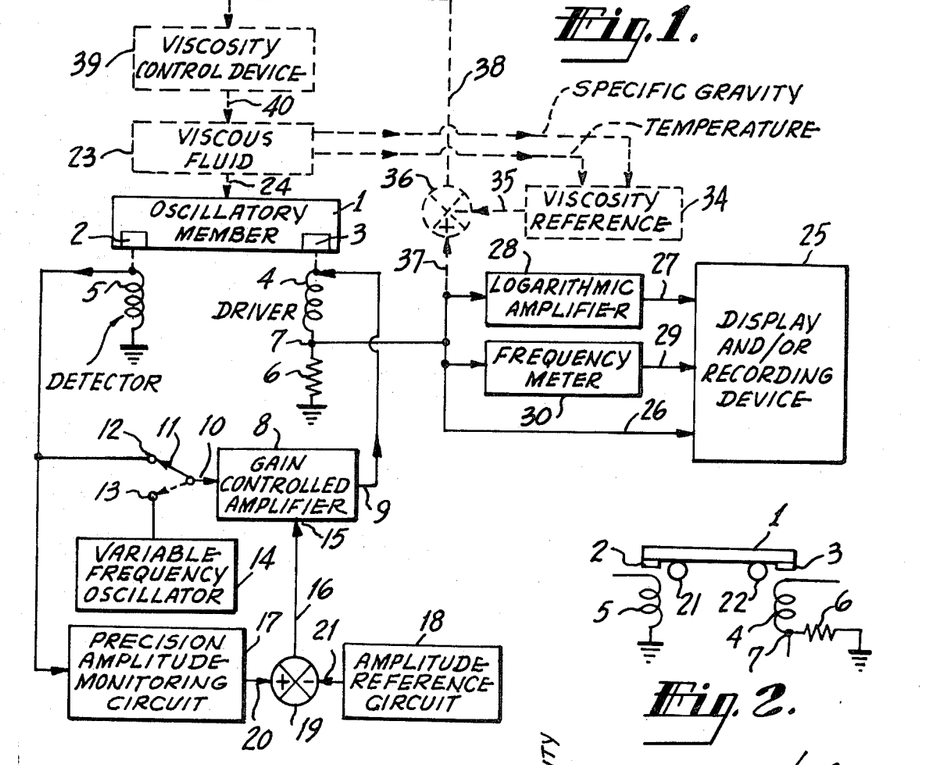
FIG. 1 illustrates, in block diagram form, the apparatus of the present invention as employed for viscous loss measurements (including the measurement of internal friction in solids) and for process control of fluid viscosity.
FIG. 2 illustrates a transducing arrangement for determining the internal friction in a solid.

The apparatus of the present invention is illustrated in generalized form in the block diagram of FIG. 1, wherein the oscillatory or vibratory member 1 is supported by any desired means (not shown) and is provided with magnetic portions 2 and 3, which may be inset into or fixed to one or more surfaces of the member 1. Obviously, in the event the member 1 comprises a magnetic material, no separate magnetic portions 2 and 3 are required.

The oscillatory member 1 is excited and maintained in mechanical oscillation by a driver coil 4, situated in proximity to the magnetic portion 3.

The mechanical oscillation of the member 1 is sensed by the detector coil 5, which is situated adjacent the magnetic portion 2.

Instead of a magnetic driving arrangement as illustrated in FIG. 1, the oscillatory member 1 may alternatively be driven by a piezoelectric or magnetostrictive transducer, or other suitable arrangement. Similarly, piezoelectric, Hall effect, capacitive, differential transformer or other transducing means may be substituted for the detector coil 5.

The current supplied to the magnetic coil driver 4 is monitored by means of the series resistor 6, which provides an output voltage at terminal 7 thereof which is a measure of the driver coil current and therefore of the power supplied to the coil. The value of the resistor 6 is selected to be sufficiently small so that it does not interfere with operation of the mechanical oscillation control circuitry.

The alternating current power supplied to the driver coil 4 is provided by a gain controlled amplifier 8 at the output terminal 9 thereof. The signal supplied to the gain controlled amplifier 8 at the input terminal 10 thereof is determined by the position of the switch 11.

In a first position 12 of the switch 11, the signal developed by the detector coil 5 is supplied to the input terminal of the gain controlled amplifier 8. In the second position 13 of the switch 11, a variable frequency oscillator 14 provides the input signal at terminal 10 of the amplifier 8.

In either position of the switch 11, the amplitude of mechanical oscillation of the oscillatory member 1 is maintained at a predetermined desired value by means of an amplitude correction signal supplied on line 16 to the gain control terminal 15 of the amplifier 8.

The amplitude correction signal is provided by a precision amplitude monitoring circuit 17, an amplitude reference circuit 18, and a comparator 19. The amplitude monitoring circuit 17 converts the output of the detector coil 5 to a DC voltage corresponding to the amplitude of the signal detected by the detector coil and therefore to the amplitude of mechanical oscillation of the vibratory member 1. This DC voltage is supplied to the comparator 19 on line 20.

The amplitude reference circuit 18 provides a DC voltage to the comparator 19 on line 21 which corresponds to the desired amplitude of oscillation. Preferably, the value of the DC voltage developed by the amplitude reference circuit 18 is manually adjustable. This adjustment remains constant for any given set of loss measurements over the desired range, which can be many orders of magnitude.

The amplitude monitoring circuit 17 must introduce only a very small phase shift into the gain control loop, if instability of the apparatus is to be avoided. A conventional peak detection circuit, or one of the operational type, has been found to be unsuitable in most applications, since the time constant introduced by the requisite filter circuit introduces excessive phase shift into the gain control loop and results in the aforementioned instability. Rather, we have found that it is preferable to employ a sample and hold circuit which is gated at intervals corresponding to the peaks of the voltage waveform developed across the detector coil 5, to provide the amplitude monitoring function. Such a circuit is capable of responding to amplitude variations within a single cycle, and therefore introduces extremely small phase shift into the gain control loop. The large gain reduces the transducer response time by at least an order of magnitude. This accounts for the rapid response to viscous loss changes.

It is helpful to consider operation of the closed electromechanical gain control loop without the precision amplitude monitoring circuit 17 and amplitude reference circuit 18. Although temporarily manually controllable, the AC current in the loop will either increase or decrease because of inherent instability and the time constant for response to viscosity changes will be long, typically of the order of many seconds. When the precision amplitude monitoring circuit 17 and amplitude reference circuit 18 are connected to the gain control loop, as in FIG. 1, the current in the loop becomes stable and the time constant becomes very small (typically of the order of fractions of a second) for response to viscosity changes.

The output voltage at terminal 7 is a function of the transducer arrangement that includes oscillatory member 1 and coils 4 and 5, and is independent of other non-linear elements in the system. High feedback gain and instantaneous response provided by precision amplitude monitoring circuit 17 insure fast and accurate response to viscosity changes.

As previously mentioned, the switch 11 determines which of the two modes of operation is to be employed. With the switch 11 in its first position 12, the output of the detector coil 5 is fed to the input terminal 10 of the gain controlled amplifier 8, the amplifier output at terminal 9 being coupled in turn to the driver coil 4. A closed loop is provided by magnetic coupling from the driver coil 4 to the magnetic portion 3, mechanical coupling from the magnetic portion 3 to the magnetic portion 2 by way of the oscillatory member 1, and magnetic coupling from the magnetic portion 2 to the detector coil 5. Thus a closed loop is provided which oscillates at a frequency substantially equal to the natural frequency of mechanical oscillation of the vibratory member 1. As previously mentioned, the mechanical amplitude of this mechanical oscillation is maintained (at a value corresponding to the DC voltage developed on line 21 from the amplitude reference circuit) by the amplitude monitoring circuit 17 and the comparator 19, the output of which varies the gain of the amplifier 8 in such a manner as to maintain the desired mechanical oscillation amplitude.

Under the aforementioned condition, i.e. with the switch 11 set in its first position 12 so that the member 1 oscillates at its natural frequency, the voltage developed at the terminal 7 of the resistor 6 is a measure of the power which is supplied to the oscillatory member 1 to overcome viscous loss associated therewith.

Under conditions where the oscillatory member 1 is situated in a vacuum or an extremely low viscosity fluid such as air, the voltage developed at terminal 7 of resistor 6 is a measure of the internal friction of the member 1 itself.

Where it is desired to obtain such an internal friction measurement, the member 1 may be suspended in the manner illustrated in FIG. 2 or in any other suitable manner.

As illustrated in FIG. 2, the member 1 is supported at two nodal points by means of transverse rods or wires 21 and 22. Thus the driver coil 4 operates, in conjunction with the magnetic portion 3, to oscillate the mechanical member 1 in a flexural mode. The suspension of the member 1 in the manner illustrated in FIG. 2 results in minimization of losses due to mechanical coupling between the vibratory member 1 and the mechanical elements (e.g. the wires 21 and 22) in contact therewith.

The current through the driver coil 4 and resistor 6, and thus the voltage developed at the terminal 7, is a measure of the internal friction within the solid member 1. Since other mechanical and electrical losses may be present to a small degree, it is necessary to calibrate the apparatus so that the voltage developed at the terminal 7 gives a true indication of internal friction.

The internal friction $Q^{-1}$ is given by $$Q^{-1} = c(i-i_0) \quad (1)$$

where $c$ is a constant of proportionality, $i$ is the current through the driver coil 4 and resistor 6, and $i_0$ is a constant determined by spurious mechanical and electrical losses. Display or recording of oscillation frequency simultaneously with display or recording of voltage at terminal 7 provides parameters related to storage modulus and loss modulus respectively for the oscillatory member 1. The apparatus of our invention in this form is called an acoustic spectrometer.

Where, instead of measuring internal friction it is desired to measure fluid viscosity, the oscillatory member 1 of FIG. 1 is made of a material which exhibits extremely low internal friction, and is immersed in a sample of the fluid 23 whose viscosity is to be determined. The line 24 represents mechanical coupling between the viscous fluid 23 and the oscillatory member 1.

The fluid 23 exerts a damping force, basically a frictional effect, on the oscillatory member 1, so that the power supplied to the driver coil 4 by the amplifier 8 to maintain the desired amplitude of mechanical oscillation (as determined by the DC voltage developed by the amplitude reference circuit 18 on the line 21) is a measure of the viscosity of the fluid 23. More specifically, the viscosity-density product of the fluid 23 is related to the current through the driver coil 4 and the resistor 6, i.e. to the voltage developed at terminal 7, by the following equation:

$$\eta\rho = k(i-i_0)^2 \quad (2)$$

$\eta$ is the fluid viscosity, $\rho$ is the fluid density, $k$ is a proportionality constant, $i$ is the current through the driver coil 4 and resistor 6, and $i_0$ is a constant determined by mechanical and electrical losses in the measuring apparatus when the vibratory member 1 oscillates in a vacuum or a very low viscosity medium such as air.

The aforementioned operation, i.e. with the switch 11 in its first position 12 and the vibratory member 1 oscillating at substantially its natural frequency, yields a measurement of viscosity at only a single shear rate, i.e. the shear rate corresponding to the frequency of oscillation of the member 1, the shear rate being given by equation 3, where S is the rate of shear and $f$ is the frequency of mechanical oscillation of the member 1.

$$S = 2\pi f \qquad (3)$$

For some purpose it is useful to know how the viscosity of a fluid varies with shear rate. That is, for a so-called Newtonian fluid, the viscosity is substantially independent of shear rate, whereas for a non-Newtonian fluid the viscosity varies with shear rate. A fluid for which the viscosity decreases with increasing shear rate is said to be pseudoplastic, whereas a fluid wherein the viscosity increases with increasing shear rate is said to be dilatant.

With the switch 11 in its second position 13, the frequency of mechanical oscillation of the vibratory member 1 may be varied by varying the frequency output of the variable frequency oscillator 14, which output is then applied to the input terminal 10 of the gain controlled amplifier 8. In this mode of operation, the amplitude of mechanical oscillation is maintained constant at the desired value by amplitude monitoring circuit 17, amplitude reference circuit 18 and comparator 19 acting in conjunction to control the gain of the amplifier 8. It is necessary that the frequency generated by the variable frequency oscillator 13 be varied at a sufficiently slow rate so that the amplitude control circuitry has sufficient time to correct for variations in mechanical oscillation amplitude of the member 1.

While the gain control electrical circuitry operates extremely rapidly, i.e. within a single cycle of the oscillation, the inertial properties of the vibratory member 1 cause the mechanical system to have a relatively long time constant. However, high negative feedback in the overall electromechanical system greatly reduces the response time.

For a typical mechanical system without the gain control loop shown in FIG. 1, we found that approximately seven seconds was required for recovery from a transient variation in mechanical oscillation amplitude. However, in the overall closed loop electro mechanical system the correction occurred in less than 0.2 second. It will be appreciated that the frequency of the variable frequency oscillator 14 can therefore by varied automatically at a relatively fast rate.

In order to monitor the internal friction of an oscillatory member or the viscosity of a fluid in which the member is immersed, the current indicating voltage at terminal 7 may be supplied to a display and/or recording device 25 on line 26. In addition, the current indicating voltage at terminal 7 may be supplied to the device 25 on an additional line 27 via a logarithmic amplifier 28. Since, as indicated by equation (2), the viscosity-density product is proportional to the square of the coil driver current, the output of the logarithmic amplifier 28 on line 27 will vary linearly with variation in fluid viscosity.

In addition, a third signal representative of the oscillation frequency may be provided to the device 25 on line 29 by a frequency meter 30, the input terminal of which is coupled to the terminal 7.

With the switch 11 in its second position 13, the variable frequency oscillator 14 can be slowly scanned in frequency, and the device 25 caused to display or record a plot of viscosity-density product versus frequency or shear rate. Such a plot will have the appearance of one of the curves 31 to 33 of FIG. 3. It is necessary that the overall frequency response characteristic of the precision amplitude monitoring circuit be such as to compensate for the frequency response characteristics of coil 5.

Figures 3, 5:
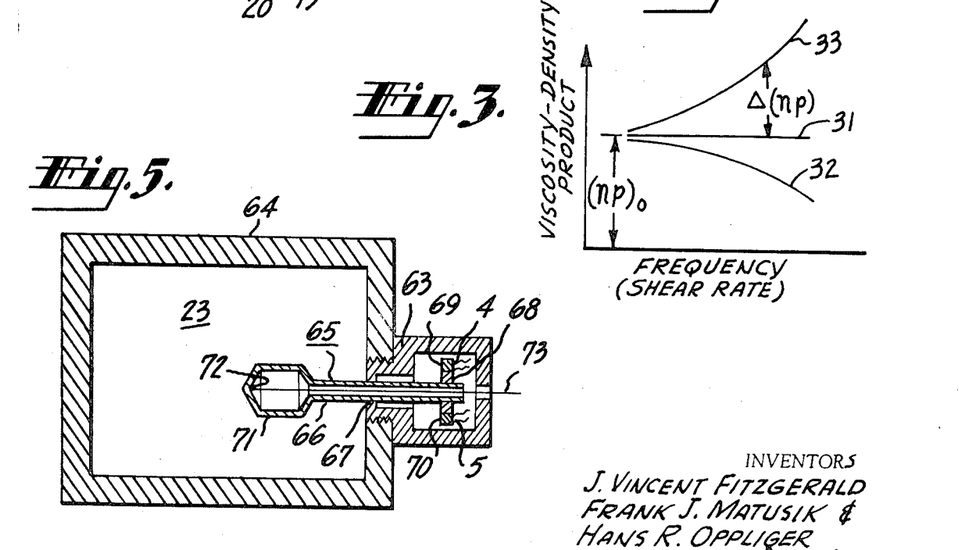
FIG. 3 shows curves illustrating the viscous behavior of Newtonian and non-Newtonian fluids.
FIG. 5 is a cross-sectional view of a vibratory device which may be permanently inserted in a fluid tank to provide viscosity measurement in conjunction with the apparatus of the present invention.

Curve 31 exhibits a constant viscosity-density product independent of shear rate and thus indicates that the corresponding fluid is Newtonian. Curve 32 exhibits a decreasing viscosity-density product with increasing shear rate, and thus indicates that the corresponding fluid is pseudoplastic. Similarly, curve 33 exhibits increasing viscosity-density product with increasing shear rate, and thus indicates that the corresponding fluid is dilatant. Thus a direct, relatively simple indication of the Newtonian or non-Newtonian nature of the fluid is provided by the arrangement described when the switch 11 is in its second position 13.

We have found that, with the switch 11 in its first position 12, so that the vibratory member 1 oscillates at substantially its natural frequency, there is a tendency for the member 1 to also oscillate at one or more harmonics of the natural frequency, resulting in generation of a distorted signal in the detector coil 5 and deterioration of measurement accuracy. Therefore, it is necessary that the frequency response characteristic of the gain controlled amplifier 8 be such that the gain of the amplifier decreases with increasing frequency in such a manner that the amplifier has insufficient gain to support mechanical oscillation in the vibratory member 1 at harmonics of its fundamental natural frequency.

The viscosity measurement apparatus shown in FIG. 1 may also be used in a process control arrangement to maintain the viscosity of the fluid 23 at a desired value determined by a signal generated by the viscosity reference circuit 34 on line 35.

The viscosity reference circuit 34 may, if desired, comprise an analog computer or function generator which takes into account the temperature and/or specific gravity of the fluid 23 whose viscosity is to be regulated. The viscosity reference signal provided by the viscosity reference generator 34 on line 35 is preferably a DC voltage, which is coupled to the viscosity comparator 36. The AC signal at terminal 7, the amplitude of which is a measure of the viscosity of the fluid 23, is coupled to the viscosity comparator 36 on line 37. The viscosity comparator 36 converts the AC viscosity indicating signal on line 37 to a DC voltage, preferably by means of an operational rectifier of conventional type, and compares the resulting DC voltage with the viscosity reference voltage on line 35 to provide a viscosity correction signal on the output line 38 from the comparator 36.

The viscosity correction signal on line 38 is applied to a viscosity control device 39, which varies the viscosity of the fluid 23 by way of a thermal, fluid flow or other technique symbolized by the line 40, in such a manner as to cause the viscosity of the fluid 23 to approach the desired viscosity as established by the DC voltage supplied by the viscosity reference circuit 34 to the viscosity comparator 36 on line 35.

For example, the fluid 23 may comprise a fuel oil the viscosity of which varies with temperature, and the viscosity control device 39 may be a temperature controller. Such an arrangement automatically varies the temperature to which the fuel oil is heated before it is supplied to a furnace or engine combustion chamber, so that a predetermined fuel flow rate results.

Alternatively, the viscosity control device may be a valve controller which varies the relative proportions of two or more constituents of the fluid 23 in such a manner as to maintain the desired viscosity. Such an arrangement is illustrated in FIG. 4.

Figures 4, 6, 7:
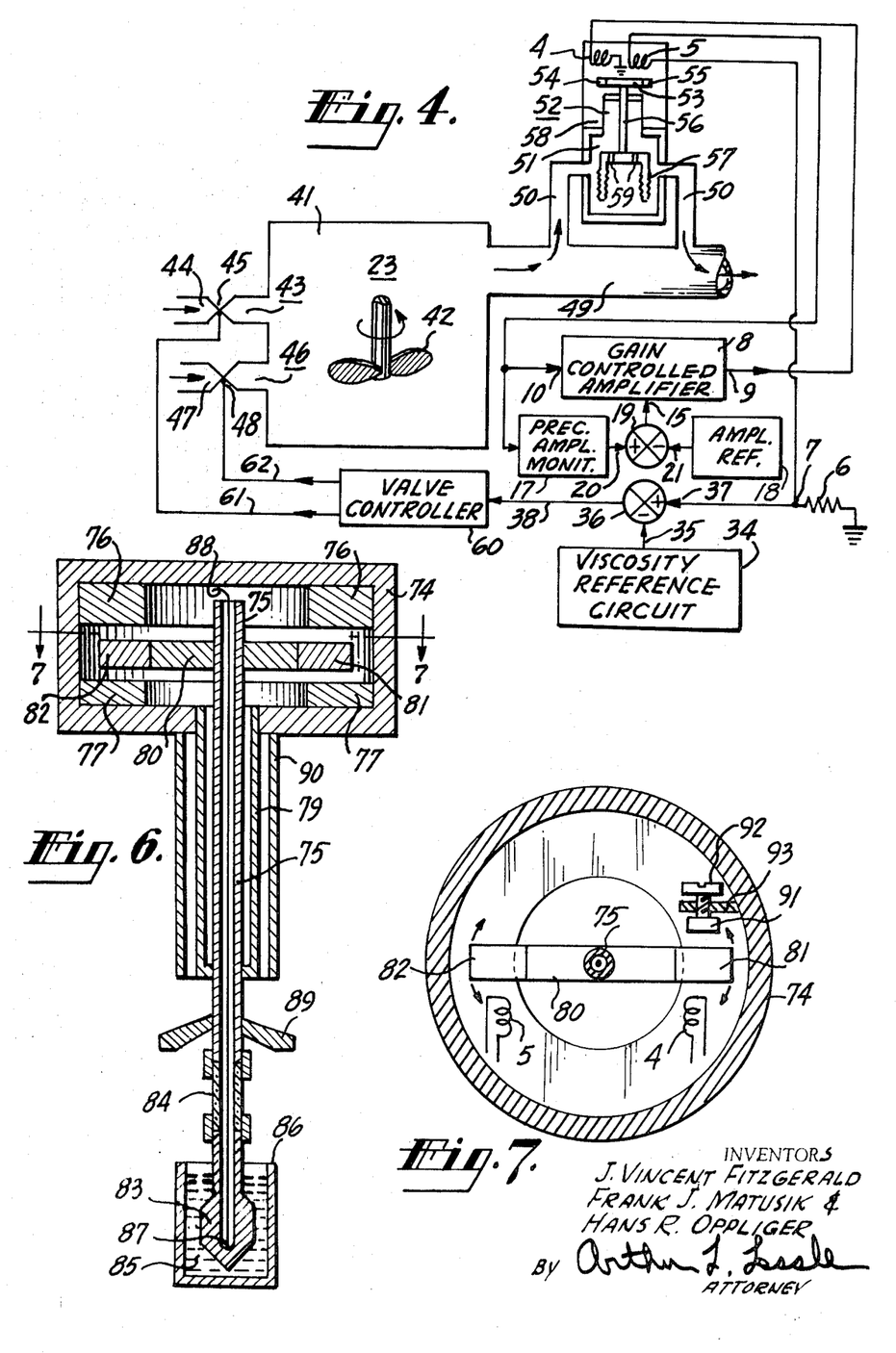
FIG. 4 shows a blending type of viscosity control system according to another embodiment of the present invention.
FIG. 6 is a cross-sectional view of a vibratory device which may be used with the apparatus of the present invention to measure fluid viscosity.
FIG. 7 is a sectional plan view of the apparatus shown in FIG. 6, taken along the cutting plane A-A'.

As shown in FIG. 4, a blending tank 41 contains a fluid 23 which is blended by means of a rotating impeller 42. The fluid 23 comprises at least two constituents having different viscosities, one of said constituents 43 being supplied to the blending tank 41 by way of a conduit 44 and controllable valve 45. The other constituent 46 is supplied to the blending tank 41 by way of a conduit 47 and controllable valve 48. The blended fluid 23 leaves the blending tank 41 by way of a conduit 49. A relatively small bypass conduit 50 diverts some of the fluid flowing through the conduit 49 so that a portion of the blended fluid flows through the viscosity measuring chamber 51. Situated in the viscosity measuring chamber 51 is a vibratory member 52, corresponding to the member 1 shown in FIG. 1.

The vibratory member 52 has an upper arm 53 with magnetic portions 54 and 55 which coact with the driving and detection coils 4 and 5 respectively. The vibratory member 52 also has a shank portion 56 and a sensing end portion 57 which is immersed in the portion of the fluid 23 which enters the chamber 51. The rigid shank 56 of the member 52 is secured to the elastic casing 58 of the sensing apparatus near the upper end of said shank.

The driver coil 4 causes the vibratory member 52 to oscillate torsionally, so that the end portion 57 is subjected to viscous shear by the fluid in the measuring chamber 51. In order to provide high sensitivity in the case where the fluid 23 is of relatively low viscosity, the end portion 57 is of annular shape with serrated inner and outer surfaces which provide additional surface area for interaction with the fluid. The end portion 57 is provided with apertures 59 which permit air or gas bubbles to escape.

The voltage developed at terminal 7 of the resistor 6 shown in FIG. 4 is a measure of the viscosity of the fluid within the measuring chamber 51, and is supplied to the comparator 36 on line 37. The comparator 36 compares the viscosity indicating voltage on line 37 with a DC voltage on line 35 indicative of the desired viscosity, and provides a viscosity correction signal to the valve controller 60 on line 38. The valve controller 60 in turn provides control signals on lines 61 and 62 to selectively operate the flow control valves 45 and 48 respectively. Thus the valve controller 60 operates to supply more or less of the fluid of greater or lesser viscosity, as dictated by the valve control signal on line 38, in such a manner as to cause the viscosity of the blended fluid 23, as ascertained in the measuring chamber 51, to approach the desired value. In a typical application for solvent blending, the desired viscosity of 1.000 centipoise density units can be controlled within ±0.0025 centipoises.

Instead of employing the particular viscosity sensing unit illustrated in FIG. 4, a viscosity sensing device of the type illustrated in FIG. 5 may be permanently threaded into a wall of the tank 41, or any other chamber or conduit containing a fluid the viscosity of which is to be monitored, remotely indicated and/or automatically controlled. The device illustrated in FIG. 5 comprises a casing 63 which is threaded into a wall of a tank or conduit 64. A torsion member 65 has a hollow shank 66 which is rigidly connected to or integral with the casing 63 in the region 67 near the center of inertia of the shank.

The torsion member 65 has an arm 68 adjacent an end of the shank 66. The arm 68 has magnetic portions 69 and 70 which coact with the driver and detector coils 4 and 5 respectively. The driver coil 4 causes the torsion member 65 to oscillate in its torsional mode. Since the torsion member 65 is connected to the casing 63 at or near its midpoint, it oscillates in a free-clamped-free mode, which exhibits minimal spurious mechanical loss.

The torsion member 65 has an enlarged hollow cylindrical end portion 71 secured to or integral with the hollow shank 66 thereof. The cylindrical end portion 71 provides a relatively large surface area for viscous shear interaction with the fluid 23 contained in the tank or conduit 64. If desired, an extremely accurate indication of the temperature of that portion of the fluid 23 whose viscosity is being measured may be obtained by means of thermocouple 72 secured to the inner surface of the hollow cylindrical end portion 71. The sensing wires 73 of the thermocouple 72 may be run through the hollow shank 66 of the torsion member 65 to external monitoring apparatus. The relatively small mass of the hollow cylindrical end portion 71 allows rapid thermal stabilization, resulting in improved accuracy of the temperature measurement.

A slightly different type of viscosity sensing device which may be employed is illustrated in FIGS. 6 and 7. This particular device is similar in many respects to that illustrated in U.S. Pat. No. 3,382,706.

Referring to FIGS. 6 and 7, the device shown comprises a casing 74 which contains a relatively rigid inner shaft 75. Additional stability is provided by relatively massive annular weights 76 and 77 secured to the inner surfaces of the casing 74.

A relatively resilient torsional annulus 79 is secured at its upper end to the casing 74 and at its lower end to the relatively rigid inner shaft 75.

An arm 80 is secured to the inner shaft 75 adjacent the upper end thereof. The arm 80 has magnetic portions 81 and 82 which coact with the driver and detection coils 4 and 5 respectively. The driver coil 4 causes the arm 80 and the inner shaft 75 to oscillate with respect to the casing 74, relative torsional movement between the inner shaft 75 and the casing 74 being permitted by the compliance of the annulus 79.

The inner shaft 75 has a cylindrical end portion 83 which is connected to the major portion of the shaft 75 by an insulating section 84 which may comprise a suitable refractory material such as alumina. The insulating section 84 provides thermal isolation when the cylindrical end portion 83 is immersed in a hot fluid 85 contained in a vessel 86. Since the shaft 75 is rigid throughout its length, the angular amplitude of mechanical oscillation of the arm 80 is identical to that of the end portion 83 immersed in the fluid 85. Preferably the shaft 75 is hollow, so that a thermocouple 87 may be secured to the inner surface of the end portion 83 with the thermocouple wires 88 extending through the open end of the shaft 75.

A radial skirt 89 is rigidly secured to the inner shaft 75 at a place just above the insulating section 84. The skirt 89 acts as an inertial balance wheel (flywheel) to filter out disturbances in the torsional oscillation of the shaft, and a heat shield or umbrella to minimize the radiation of heat from the fluid 85 toward the upper portion of the sensing device.

A sheath 90 surrounds the annulus 79. The sheath 90 is secured at its upper end to the casing 74, and serves to protect the annulus 79 from damage due to improper handling. The sheath 90 also serves as a convenient means for clamping the sensing device to a suitable support.

A small magnet 91, positionable by means of a thumb screw 92 which threadably engages a flange 93, is employed to provide a zero adjustment of the arm 80.

In a typical embodiment, the device shown in FIGS. 6 and 7 may be designed so that the natural frequency of oscillation of the shaft 75 in its torsional mode, i.e. the frequency established by the inertial mass of the shaft 75 and the resilience characteristics of the annulus 79, is on the order of 200 Hz. While viscosity sensors described above all undergo torsional motion, the principles of this invention are equally applicable to sensors utilizing other modes of vibration, such as longitudinal and flexural modes.

Figure 8:
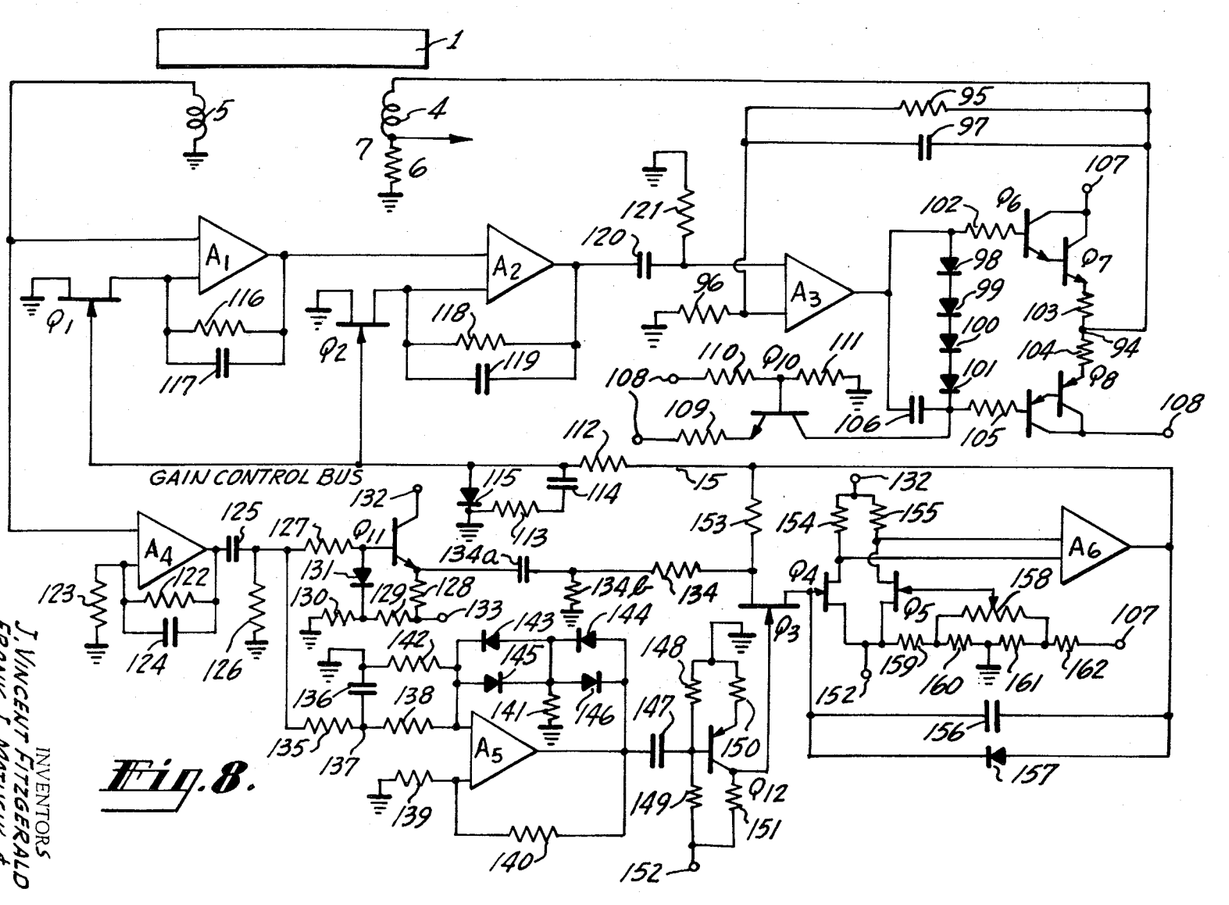
FIG. 8 shows a preferred form of the electrical control circuitry which may be utilized in the apparatus shown in FIGS. 1 and 4.

FIG. 8 shows a typical electrical circuit arrangement for the oscillation control circuitry shown in FIGS. 1 and 4. The circuitry shown in FIG. 8 employs six operational amplifiers A1 – A6 which are preferably of integrated circuit construction. These operational amplifiers may, for example, be the type sold under the trade designation μA709 by Fairchild Semiconductor Division of Fairchild Camera and Instrument Corporation, Mountain View, California.

Each of the operational amplifiers A1 – A6 is of the differential input type, i.e. the amplifiers are constructed so that under open loop conditions the output voltage of each amplifier is determined by the amplifier open loop gain multiplied by the difference between the potentials applied to the two input terminals thereof. The polarity of the output voltage of each amplifier is dependent upon the polarity of the difference between the input voltages thereto. In the circuit diagram shown in FIG. 8, the upper input line to each operational amplifier is connected to the non-inverting terminal thereof, while the lower input line is connected to the inverting terminal thereof.

The circuitry shown in FIG. 8 also contains five field effect transistors Q1 to Q5 which are of the junction type, and seven bipolar transistors Q6 to Q12; Q8, Q9 and Q12 are of the PNP type and the ramaining bipolar transistors are of the NPN type.

Operational amplifiers A1 to A3, bipolar transistors Q6 to Q10, and field effect transistors Q1 and Q2, together with their associated circuitry comprise the gain controlled amplifier 8 shown in FIGS. 1 and 4. Operational amplifier A3 drives the complementary symmetry power amplifier comprising transistors Q6 to Q9, the output of the power amplifier at terminal 94 being connected to the driver coil 4 and resistor 6. In effect, the power amplifier stage comprising transistors Q6 to Q9 acts as the output stage of the operational amplifier A3, the gain of the amplifier A3 together with its power output stage comprising transistors Q6 to Q9 being initially determined by the ratio of feedback resistor 95 to input resistor 96.

Feedback capacitor 97 reduces the gain of the output stage at higher frequencies to insure (as previously mentioned) that the amplifier does not sustain mechanical oscillation of the member 1 at any of its harmonic frequencies. Diodes 98–101 provide operating bias and temperature compensation for transistors Q6 to Q9. Resistors 102 to 105 provide bias, balance and current limiting functions for the power amplifier stage, while capacitor 106 prevents parasitic oscillations of the complementary symmetry power amplifier.

Operating power for the output stage is supplied via a positive DC terminal 107 and a negative DC terminal 108.

The gain of the power amplifier stage is fixed. Transistors Q10 and associated resistors 109, 110 and 111 provide bias for diodes 98–101. The collector of Q10 is connected to the junction of resistor 105 and capacitor 106, while the base of Q10 is connected to the junction of resistors 110 and 111, the other end of resistor 111 being grounded and the other end of resistor 110 being connected to the source of negative DC voltage 108.

The gain control voltage on terminal 15 is applied, through a time constant network comprising resistors 112 and 113 and capacitor 114, to the gates of junction field effect transistors Q1 and Q2. Diode 115 prevents the gain control voltage applied to transistors Q1 and Q2 from going positive, since these transistors would be rendered inoperative or destroyed by such bias conditions. Since the gain of the operational amplifier A1 is determined by the ratio of feedback resistor 116 to the effective source-drain resistance of the junction field effect transistor Q1, variation of the gain control voltage applied to the gate of Q1 results in a corresponding variation of the closed loop amplifier (A1) gain. The feedback capacitor 117 provides high frequency roll-off to minimize the effect of higher harmonics of the natural frequency of the vibratory member 1.

Similarly, feedback resistor 118 in conjunction with junction field effect resistor Q2 determines the closed loop gain of amplifier A2, while feedback capacitor 119 provides the desired high frequency roll-off. Capacitor 120 and resistor 121 provide DC isolation between amplifiers A2 and A3.

Thus the gain controlled amplifier comprising operational amplifiers A1–A3, bipolar transistors Q6–Q10, and junction field effect transistors Q1 and Q2 provides a voltage gain which is accurately controllable and which is variable over an extremely wide dynamic range, since two stages of the amplifier are gain controlled. In a typical embodiment, the overall gain of the amplifier can be varied over a range of 300:1. To prevent distortions introduced by transistors Q1 and Q2 the voltage level at coil 5 is kept low by manual adjustment of potentiometer 158.

In order to provide the gain control voltage at the terminal 15, the signal generated by the detector coil 5 is applied to and amplified by the operational amplifier A4, the gain of which is fixed by feedback resistor 122 and series resistor 123, high frequency roll-off being provided by feedback capacitor 124.

When switch 11 is in its second position (FIG. 1), the impedance of the pickup coil 5 increases as the frequency increases. Feedback capacitor 124 compensates for this frequency response so that the viscosity responsive voltage at resistor 7 is a linear of frequency. In this case, where it is desired to obtain a viscosity responsive voltage independent of frequency (for Newtonian fluids, as illustrated by curve 31 of FIG. 3) the driver coil 4 may be driven by a current source (i.e., a source having a very high internal impedance); this may be accomplished by coupling an impedance step-up transformer between the output of the gain controlled amplifier and the driver coil 4, the transformer providing a high output impedance to the coil.

The output of operational amplifier A4 is coupled to an emitter-follower Q11 and operational amplifier A5 by a coupling network comprising blocking capacitor 125 and resistor 126. The AC output signal of amplifier A4 is coupled to transistor Q11 via resistor 127, bias conditions for the emitter-follower Q11 being provided by resistors 126–128. Diode 131 prevents the AC signal at the base of Q11 from swinging too far negative and precludes opening of switch Q3 by negative signals. The bias for diode 131 is provided by resistors 129 and 130. Operational potential for transistor Q11 is supplied via positive DC voltage terminal 132 and negative DC voltage terminal 133. The output of emitter-follower Q11 is coupled to the source of junction field effect transistor Q3 via resistor 134. To reduce drift by providing DC stability the decoupling capacitor 134a and resistor to ground 134b are provided.

The AC voltage output of operational amplifier A4 is coupled to operational amplifier A5 through a 90° phase shift network comprising resistor 135 and capacitor 136. The time constant of this phase shift network is chosen to be sufficiently long so that approximately 90° phase shift is obtained at all frequencies at which the member 1 is to be driven by driving coil 4.

As a result of the action of the phase shift network, the AC voltage waveform at terminal 137 has zero crossovers which correspond to peaks of the Ac waveform of the voltage developed at the output of amplifier A4.

The operational amplifier A5, together with series resistors 138 and 139, feedback resistor 140 and auxiliary resistors 141 and 142 together with diodes 143–146, acts as a squaring circuit to convert the waveform appearing at terminal 37 to a square wave the transitions of which occur at times corresponding to the zero crossovers of the voltage waveform appearing at terminal 137.

The squaring circuit which comprises amplifier A5 and its associated circuit elements of conventional type are well known in the electronics art.

The square wave output signal generated by amplifier A5 is differentiated by capacitor 147 in conjunction with resistors 148 and 149 to provide a series of positive and negative pulses occurring at times corresponding to the transitions of the square wave output of amplifier A5. Therefore the pulses appearing at the base of transistor Q12 occur at times corresponding to the peaks of the waveform generated by the amplifier A4.

Transistor Q12, together with bias resistors 148 to 151, amplifies and clips the differentiated waveform appearing at its base so that the waveform at the collector of Q12 comprises pulses occurring at times corresponding to the peaks of only a given polarity of the AC waveform developed at the output of amplifier A4.

The pulses developed at the collector of Q12 are applied to the gate of junction field effect sampling transistor Q3, which momentarily is rendered conductive between its source and drain electrodes at times corresponding to peaks in the waveform developed at the output of amplifier A4, and correspondingly to peaks in the waveform appearing at the emitter of transistor Q11.

Operational amplifier A6, together with transistors Q4 and Q5 and their associated circuit elements, forms a voltage storage circuit arrangement of conventional type, well known in the electronics art. The junction field effect transistors Q4 and Q5, which should have similar characteristics, are connected in differential fashion between positive DC voltage supply terminal 132 and negative DC voltage supply terminal 152. Negative DC supply terminal 152 also supplies operating power for transistor Q12.

Feedback resistor 153, in conjunction with series resistor 134, fixes the closed loop gain of operational amplifier A6 during the short intervals, corresponding to the peak of the waveform appearing at the emitter of Q11, that sampling transistor Q3 is rendered conductive.

Transistors Q4 and Q5, together with their load resistors 154 and 155, operate as the input stage of amplifier A6. During each short interval when transistor Q3 is rendered conductive, storage capacitor 156 is charged to a voltage which is a measure of the amplitude of the voltage developed across detector coil 5 and hence of the amplitude of mechanical oscillation of the vibratory member 1.

Diode 157 prevents application of improper bias to the field effect transistor Q4.

Between sampling intervals, the capacitor 156 remains charged to the DC voltage which corresponds to the amplitude of mechanical oscillation of the member 1, the high input impedance at the gate of transistor Q4, and the high "off" impedance of transistor Q3 preventing loss of charge from the capacitor 156. Since diode 157 is reverse biased between sampling intervals, the capacitor 156 loses no charge thereto. The bias network which comprises potentiometer 158 and resistors 159–162, in conjunction with the DC voltage source applied to terminal 107, provides a manually adjustable DC voltage to the gate of transistor Q5 which is a measure of the desired amplitude of mechanical oscillation. This resistor network, comprising resistors 158-162, thus corresponds to the amplitude reference circuit 18 shown in FIGS. 1 and 4.

Similarly, the differential amplifier comprising transistors Q4 and Q5 corresponds to the comparator 19 shown in FIGS. 1 and 4.

Thus, at all times a DC voltage is applied to the gate of transistor Q4 which is representative of the instantaneous amplitude of mechanical oscillation of the member 1, while the DC voltage at the gate of Q5 represents the desired amplitude of mechanical oscillation, so that the output voltage of amplifier A6 is the amplitude correction signal which represents the difference between the actual and desired mechanical oscillation amplitudes. This amplitude correction voltage is applied to the gain control terminal 15 to vary the gain of gain controlled amplifier 8 in the manner which has previously been described.

We claim:

1. Apparatus for determining the viscous loss in a material, comprising:
   a vibratory member;
   driving means for supplying power to maintain said member in mechanical oscillation;
   a transducer for detecting said oscillation;
   an amplitude monitoring circuit coupled to said transducer for providing a first signal having a value manifesting the amplitude of said oscillation;
   means for providing an amplitude reference signal having a value corresponding to a desired amplitude of mechanical oscillation;
   a comparator for providing an amplitude correction signal having a value determined by the difference between the value of said first signal and the value of said amplitude reference signal;
   means for applying said amplitude correction signal to said driving means, so that said driving means supplies sufficient power to said member to overcome said viscous loss and maintain said member in mechanical oscillation at said desired amplitude; and
   means for providing an output signal having a value which is a measure of the power supplied to said member by said driving means.

2. Apparatus according to claim 1, wherein said material comprises said member, so that said output signal indicates the internal friction in said member.

3. Apparatus according to claim 1, wherein said material is a fluid in which said member may be immersed, so that said output signal is a measure of the viscosity of said fluid.

4. Apparatus according to claim 1, wherein said driving means includes a variable gain amplifier having input and output terminals, the gain of said amplifier being controlled by said amplitude correction signal.

5. Apparatus according to claim 4, wherein the phase shift introduced by said amplitude monitoring circuit is sufficiently small so that said apparatus remains electrically stable.

6. Apparatus according to claim 5, wherein the input terminal of said amplifier is coupled to said transducer, so that said member is caused to oscillate at substantially the natural frequency thereof.

7. Apparatus according to claim 6, wherein the gain of said amplifier decreases with increasing frequency in such a manner that said amplifier has insufficient gain to support mechanical oscillation in said member at harmonics of said natural frequency.

8. Apparatus according to claim 4, further including a variable frequency oscillator coupled to the input terminal of said amplifier, and means for varying said frequency.

9. Apparatus according to claim 8, including means for rendering said output signal independent of changes in the impedance of said driving means as the frequency of said oscillator is varied.

10. Apparatus according to claim 4, wherein said material is a fluid in which said member may be immersed, further comprising frequency determining means for ascertaining the change in oscillation frequency of said member due to said immersion, the presence or absence of said change indicating whether said fluid is Newtonian.

11. Apparatus according to claim 4, wherein said driving means further includes a coil adjacent said member for generating a magnetic field in response to the signal provided at the output terminal of said amplifier, the portion of said member adjacent said coil comprising magnetic material.

12. Apparatus according to claim 11, wherein said output signal is derived from the current flow through said coil.

13. Apparatus according to claim 12, wherein said member oscillates in a torsion mode.

* * * * *